May 29, 1956  V. W. SALMON  2,747,910
FLEXIBLE GATE FASTENER AND TIGHTENER
Filed Aug. 18, 1954  2 Sheets-Sheet 2
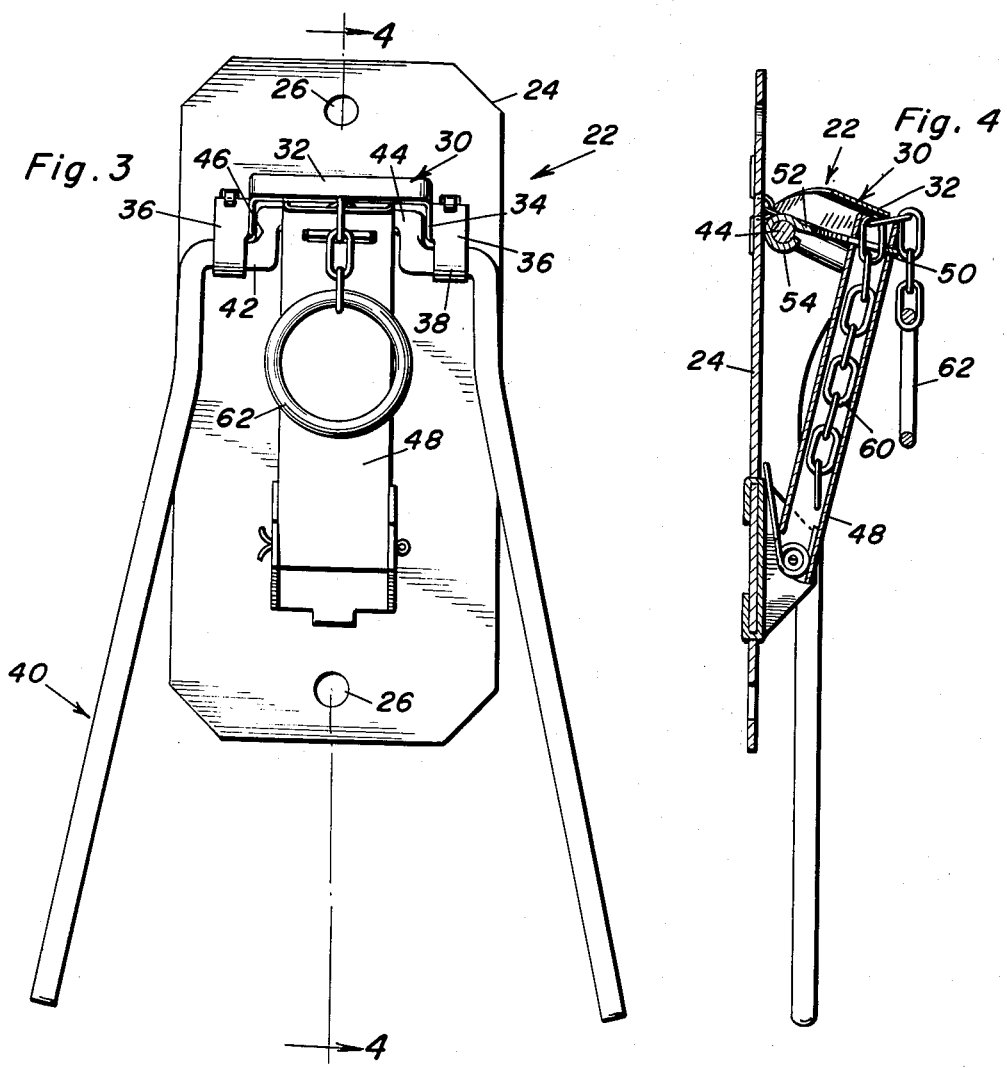
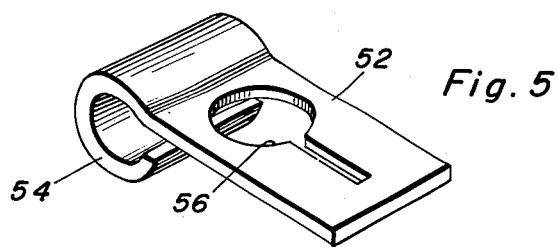
Vina W. Salmon
INVENTOR.

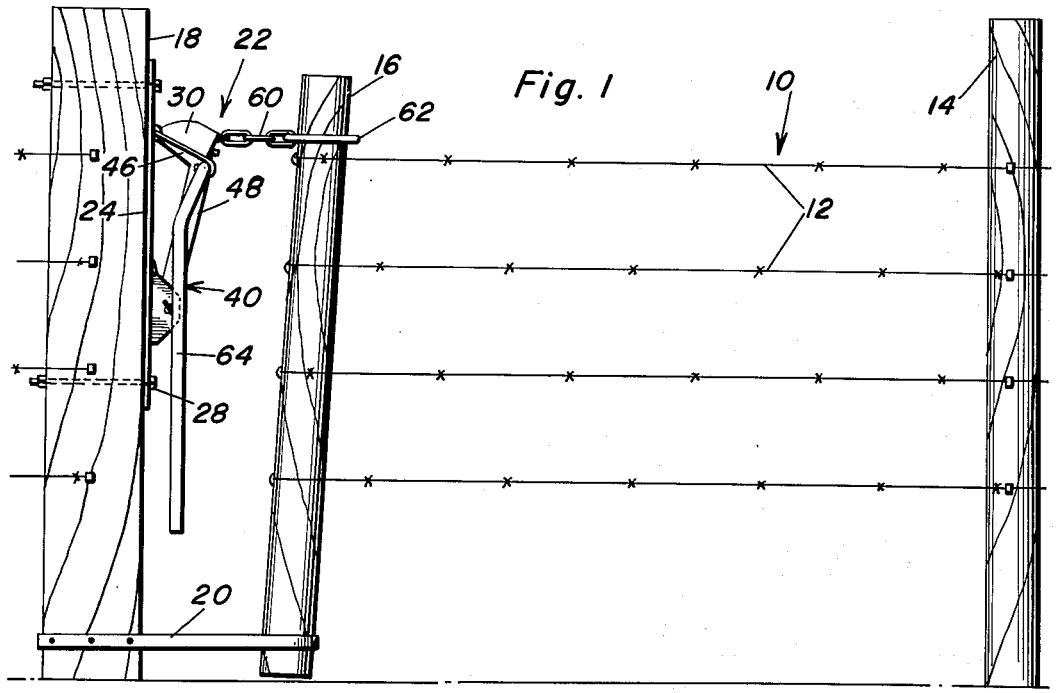
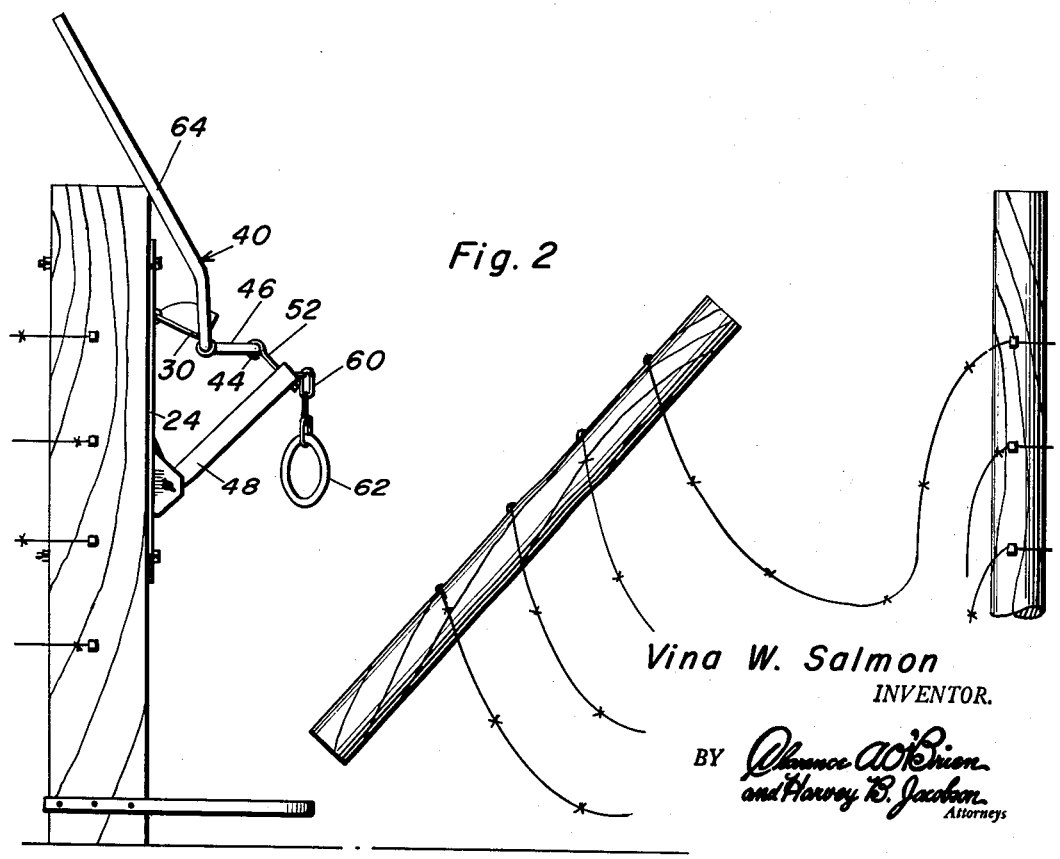

United States Patent Office 2,747,910
Patented May 29, 1956

2,747,910

FLEXIBLE GATE FASTENER AND TIGHTENER

Vina W. Salmon, Deadwood, S. Dak.

Application August 18, 1954, Serial No. 450,620

7 Claims. (Cl. 292—247)

The present invention relates to fence gates and more particularly relates to flexible fence gates wherein the wires which form the gate proper are attached at spaced points therealong to an upright fence post or gatepost manually movable to open and close the gate.

The primary object of the invention is to provide a novel lever means for maintaining the gate in a closed position and releasing the gate to an open position which device includes means for positively adjusting the tautness of the wires of the fence gate in closed position.

A highly important object of the invention is in the provision of a gate fastening means for drawing the gatepost toward a fence post and tighten the wires on the gate wherein the gatepost is attached to the device by means of a flexible member which flexible member is in turn a portion of the actuating means of the device for releasing and pulling the gatepost toward its adjacent fence post.

A still further object of the invention is in the provision of a lever mechanism for tightening and releasing the gatepost which will automatically lock the gatepost in its tightened position upon movement of the lever mechanism in one direction and which lever mechanism utilizes the tension of the gatepost wires in the top position to assist in the locking action thereof.

A more specific object of the invention is in the provision of a combination swinging bracket, lever mechanism and flexible element wherein the flexible element is attached to the gatepost, is extensible and retractible for varying the tautness of the gate wires in the closed position of the gate and which serves as a medium for holding the elements of the lever mechanism in a unitary assembly while providing means for adjusting the tautness of the wires of the gatepost.

A last object of the invention to be mentioned specifically is in the provision of a gatepost fastening device for flexible gates which may be inexpensively manufactured, easily and conveniently employed and operated to secure or release the gate which fastener may be mounted with the handle mechanism to close in up or down positions and which fastening device may be mounted on any size post without necessitating modification or shortening of the post, wall or other member to which it is attached.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a front view of a flexible gate with the gate tightening fastening device of the present invention holding the gate in its closed position;

Figure 2 is a view similar to Figure 1 disclosing the movement of the gate fastening device upon release of the gate to its open position;

Figure 3 is a front view of the fastening device per se on an enlarged scale in its closed position;

Figure 4 is a cross-sectional view of the fastening device per se taken substantially along the plane of section line 4—4 of Figure 3; and Figure 5 is a perspective view of the flexible element connecting means constituting a portion of the fastening device.

In the drawings there is shown a flexible gate designated in its entirety by the numeral 10, the gate consisting essentially of a plurality of vertically spaced flexible members or wires 12 extending from a fixed fence post 14 to a movable fence or gatepost 16 to which the ends of these wires are attached also in vertically spaced relation. Adjacent the gatepost 16 is a second post or wall or other supporting member 18. Adjacent the base of the supporting member 18 is secured a strap or the like 20 forming a loop into which the lower end of the gatepost 16 projects. Mounted on the supporting member above the strap member 20 is a fastening device 22, which constitutes the present invention, for releasably retaining the gatepost 16 adjacent the supporting member 18 to draw the flexible wires 12 of the gate 10 in taut position to close the gate and to release the gatepost 16 to relax the wires 12 and enable the movement of the gatepost 16 and the flexible wires 12 away from the fixed fence post 14 and the supporting member 18 to open the gate.

The fastening device 22 comprises a mounting means in the form of an elongated mounting plate 24 which may be fastened to the supporting member, the fence post 18 in the drawings, in any suitable manner, the plate 24 being shown with apertures 26 adjacent the upper and lower ends thereof for the reception of lag screws 28 to secure the mounting plate to the supporting member 18.

Adjacent the upper end of the mounting plate 24 is swingably secured a hinge bracket 30 having a central web portion 32, downwardly projecting side flanges 34 and outturned free edge portions or lateral flanges 36 at the side edges thereof terminating in hooks or eyes 38 at the free ends thereof.

Lever means 40 in the form of a U-shaped lever has the end portions of the web 42 thereof secured in the hooks 38 of the hinge bracket 30 for swinging movement with respect thereto. The central portion of the web 42 is laterally offset from the ends of the web as at 44 and are disposed normally adjacent the mounting plate 24, the connecting portions 46 of the web connecting the offset portion 44 of the web to the end portion of the web being normally parallel to the hinge bracket 30 and underlying the web of the same.

Adjacent the lower end of the mounting plate 24, one end of an elongated member 48 is pivotally secured in any suitable manner.

The elongated member is in the form of a hollow casing having an open upper end.

Adjacent the free end of the hollow casing 48 the same is transversely slotted as at 50 and a connecting means in the form of a flat plate 52 has one end portion thereof slidably extending through the slotted openings 50 transversely through the hollow section of the casing. The other end portion of the connecting plate 52 is looped to form an eye as at 54 and is swingably or pivotally attached to the laterally offset portion 44 of the web 42 of the lever means 40; a view of this connecting plate 52 per se is most clearly shown in Figure 5. As will be noted from examination of that figure, the free end portion of the plate 52 is provided with a keyhole opening or slot 56, a portion of which is always disposed within the hollow portion of the elongated hollow casing 48.

Loosely disposed within the elongated casing 48 is a flexible element in the form of a chain 60. The chain 60 projects outwardly from the upper end of the hollow casing 48 and in its passage through this casing passes through the keyhole slot 56 of the casing. By virtue of its particular shape, namely the connecting links of the chain, by extending the link through the slotted portion of the keyhole slot 56, the chain will be automatically locked in this position against further outward projecting movement from the upper end of the hollow casing 48. On the free end of the chain 60 there may be conveniently provided a ring 62 for slipping over the upper end of the gatepost 16.

However, it will be quite apparent that the flexible element could be some element other than the chain provided it had spaced lateral deflections thereof so the same would be locked in position in the slotted portion of the keyhole slot and could be simply looped at its outer end around the gatepost or provided with some other fastening means than the ring 62 if desired. It should be further noted, that the mounting plate 24, although a convenience, is not necessary to the practice of the invention since the hinge bracket 30 and the lower end or pivotally secured or attached end of the hollow casing 48 would be secured directly to the fence post 18 or any other supporting surface.

The operation of the device is comparatively simple as will be noted from an examination of Figures 1 and 2. As shown in Figure 1, the laterally offset portion 44 of the yoke or lever means 40 is disposed adjacent the mounting plate 24, the connecting portion 46 of the lever means connecting the laterally offset portion 44 to the end portion of the web 42 of the U-shaped lever 40 being substantially parallel to the hinge bracket 30, the handles 64 extending from the ends of the web portion of the lever means 40 extending downwardly and substantially parallel to the post 18. In this position, the elongated member 48 is drawn to its closest position at its free end with respect to the post 18, and the chain or flexible element 60 through the medium of its free end ring 62 draws the gatepost 16 toward the post 18 and the lower end of the post 18 being in the loop 20 draws the wires 12 of the gatepost taut and closes the flexible gate.

To open the gate, the handle 64 of the lever is swung upwardly as shown in Figure 2 so that the laterally offset portion 44 of the web is swung outwardly away from the mounting plate 24 thereby swinging the elongated member 48 outwardly from the mounting plate 24 and releasing the tautness of the gate wires 12. The ring 62 is then slipped off the gatepost 16 and the gate may be opened at will.

To vary the tautness of the gate wires 12 in their closed position, it is simply necessary to slide the connecting plate 52 through the slotted openings 50 adjacent the upper end of the hollow casing 48 to draw the chain 60 through the enlarged portion of the keyhole slot 56 and lengthen or shorten the exposed length of the chain 60 as desired.

By virtue of the downwardly slanting angle of the hinge bracket 30 in its normal position and the upwardly slanting angle of the laterally offset portion 44 and its connecting portions 46 of the web 42 of the lever means 40, when the gate is closed, the laterally offset portion is in over center position and thus the locking action of the device 22 is aided by the tautness of the wires 12 of the gate. Consequently, only a slight movement of the lever means handles 64 away from the supporting surface or supporting post 18 for the device 22 brings the laterally offset portion 44 below center to release the tautness on the gate wires 12.

As will be noted from the foregoing description, the connecting plate 52 serves a dual function in the device of providing means whereby the flexible element may be lengthened or shortened as to its projecting portion to vary the tautness of the wires 12 of the gatepost while at the same time providing a means for attachment of the upper end portion of the elongated member 48 to the lever means 40 to enable the swinging action of the fastening means upon movement of the lever means 40.

The over-all effect of the device is to provide a novel gate fastening device including a novel lever and chain mechanism which will enable the gate wires to be drawn to the degree of tautness or tightness desired under any circumstances.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A device for drawing two fence posts together comprising a bracket, means for swingably mounting said bracket on one of the fence posts, lever means swingably attached to said bracket remote from said swingably mounting means, an elongated member, means for swingably attaching said elongated member adjacent one end thereof to said one fence post remote from said bracket about an axis parallel to the swinging axis of said bracket, said lever means having a portion thereof laterally offset from the portion of the lever swingably attached to the bracket and movable toward and away from the bracket upon swinging movement of the lever means, means connecting said laterally offset portion and said elongated member to one another for moving the elongated member in response to movement of the lever means including a flexible element extending from said elongated member having means thereon for attachment to the other fence post.

2. A device for drawing two fence posts together comprising a bracket, means for swingably mounting said bracket on one of the fence posts, lever means swingably attached to said bracket remote from said swingably mounting means, an elongated member, means for swingably attaching said elongated member adjacent one end thereof to said one fence post remote from said bracket about an axis parallel to the swinging axis of said bracket, said lever means having a portion thereof laterally offset from the portion of the lever swingably attached to the bracket and movable toward and away from the bracket upon swinging movement of the lever means, means connecting said laterally offset portion and said elongated member to one another for moving the elongated member in response to movement of the lever means including a flexible element extending from said elongated member having means thereon for attachment to the other fence post, said elongated member being tubular for at least a portion thereof adjacent its free end, a portion of said connecting means being transversely slidable through the tubular portion of said elongated member, said flexible element being slidably disposed in said tubular portion, the transversely slidable portion of said connecting means including means adjustably retaining said flexible element against outward sliding movement from said elongated member.

3. A device for drawing two fence posts together comprising a bracket, means for swingably mounting said bracket on one of the fence posts, lever means swingably attached to said bracket remote from said swingably mounting means, an elongated member, means for swingably attaching said elongated member adjacent one end thereof to said one fence post remote from said bracket about an axis parallel to the swinging axis of said bracket, said lever means having a portion thereof laterally offset from the portion of the lever swingably attached to the bracket and movable toward and away from the bracket upon swinging movement of the lever means, means connecting said laterally offset portion and said elongated member to one another for moving the elongated member in response to movement of the lever means including a flexible element extending from said elongated member having means thereon for attachment to the other fence post, said elongated member being tubular for at least a portion thereof adjacent its free end, a portion of said connecting means being transversely slidable through the tubular portion of said elongated member, said flexible element being slidably disposed in said tubular portion, the transversely slidable portion of said connecting means including means adjustably retaining said flexible element against outward sliding movement from said elongated member, the transversely slidable portion of said connecting means comprising an elongated flat plate, said plate having a keyhole opening therein, said flexible element being adjustably retained in the slotted portion of said opening.

4. A device for drawing two fence posts together, comprising an elongated member, means at one end of said member for pivoting the same to one of the fence posts, a hinge bracket, means at one end of said bracket for attaching the same to the one fence post remote from said elongated member, lever means swingably fastened to said bracket and including a laterally offset portion, means connecting said laterally offset portion and said elongated member being swingably attached to said laterally offset portion and slidably connected to said elongated member, a flexible element extending from the free end of said elongated member and having means on the end thereof for attachment to the other fence post, said flexible element engaging said connecting means and limiting the sliding movement of said connecting means relative to said elongated member.

5. A device for drawing two fence posts together, comprising an elongated member, means at one end of said member for pivoting the same to one of the fence posts, a hinge bracket, means at one end of said bracket for attaching the same to the one fence post remote from said elongated member, lever means swingably fastened to said bracket and including a laterally offset portion, means connecting said laterally offset portion and said elongated member being swingably attached to said laterally offset portion and slidably connected to said elongated member, a flexible element extending from the free end of said elongated member and having means on the end thereof for attachment to the other fence post, said flexible element engaging said connecting means and limiting the sliding movement of said connecting means relative to said elongated member, said elongated member comprising a hollow casing open at the free end thereof.

6. A device for drawing two fence posts together, said device comprising a plate adapted for mounting on one fence post, a bracket swingably mounted on said plate, lever means swingably attached to the free end of said bracket, an intermediate portion of said lever means between the side edges of said bracket extending normally in a plane at an angle to the plane of said plate, an elongated member swingably attached at one end thereto to said plate remote from said bracket, means pivotally connected to said intermediate portion of said lever means and attached to said elongated member adjacent the free end thereof whereby swinging movement of the lever means swings said elongated member toward and away from said plate, and a flexible element extending from said elongated member and having means thereon for attachment to the other fence post whereby the flexible element is tightened and slackened in response to movement of the elongated member.

7. A device for drawing two fence posts together, said device comprising a plate adapted for mounting on one fence post, a bracket swingably mounted on said plate, lever means swingably attached to the free end of said bracket, an intermediate portion of said lever means between the side edges of said bracket extending normally in a plane at an angle to the plane of said plate, an elongated member swingably attached at one end thereto to said plate remote from said bracket, means pivotally connected to said intermediate portion of said lever means and attached to said elongated member adjacent the free end thereof whereby swinging movement of the lever means swings said elongated member toward and away from said plate, and an element extending from said elongated member and having means thereon for attachment to the other fence post.

References Cited in the file of this patent
UNITED STATES PATENTS

| | | |
|---|---|---|
| 762,481 | Kipping | June 14, 1904 |
| 1,090,634 | Linton | Mar. 17, 1914 |